United States Patent
Ono et al.

(10) Patent No.: US 10,855,518 B2
(45) Date of Patent: Dec. 1, 2020

(54) COMPUTER HAVING AN EMBEDDED SWITCH

(71) Applicant: Lenovo Enterprise Solutions (Singapore) Pte. Ltd., Singapore (SG)

(72) Inventors: Makoto Ono, Chapel Hill, NC (US); Roberto Henrique Jacob Da Silva, Oak Park, CA (US); Luke David Remis, Rochester, NY (US); Christopher Landon Wood, Chapel Hill, NC (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 16/183,408

(22) Filed: Nov. 7, 2018

(65) Prior Publication Data
US 2020/0145279 A1    May 7, 2020

(51) Int. Cl.
| | |
|---|---|
| *H04L 12/28* | (2006.01) |
| *H04L 12/24* | (2006.01) |
| *H04L 29/06* | (2006.01) |
| *H04L 12/703* | (2013.01) |
| *H04L 12/947* | (2013.01) |

(52) U.S. Cl.
CPC .......... *H04L 41/0668* (2013.01); *H04L 45/28* (2013.01); *H04L 49/25* (2013.01); *H04L 69/18* (2013.01)

(58) Field of Classification Search
CPC ..... H04L 2012/5619; H04L 2012/5627; H04L 2012/6429
USPC ................. 370/419, 420, 437, 467
See application file for complete search history.

(56) References Cited

U.S. PATENT DOCUMENTS

| | | | |
|---|---|---|---|
| 8,407,367 B2* | 3/2013 | Chandra ............... | G06F 13/387 709/230 |
| 8,667,110 B2* | 3/2014 | Groenendaal .......... | H04L 63/20 709/201 |
| 8,959,264 B2* | 2/2015 | Decesaris ........... | G06F 13/4022 710/51 |
| 9,003,088 B2* | 4/2015 | Chandrasekhar ... | G06F 9/45558 710/104 |
| 9,942,171 B2* | 4/2018 | Labonte .............. | H04L 49/3045 |
| 10,360,125 B2* | 7/2019 | Vanderah ............ | G06F 11/3031 |
| 10,387,346 B2* | 8/2019 | Ni ....................... | G06F 13/4282 |

(Continued)

OTHER PUBLICATIONS

Wikipedia, Peripheral, Mar. 3, 2020, pp. 1 and 2.*

(Continued)

*Primary Examiner* — Dmitry Levitan
(74) *Attorney, Agent, or Firm* — Jeffrey Streets

(57) ABSTRACT

A computer includes a central processing unit, a management processor, a first network adapter, a second network adapter, and an embedded switch. The embedded switch includes a port coupled to the central processing unit, a port coupled to the management processor, a port coupled to the first network adapter, and a port coupled to the second network adapter. Furthermore, the embedded switch provides both the central processing unit and the management processor with access to an external network using a selected one of the first and second network adapters. Optionally, the computer may include additional network adapters.

17 Claims, 6 Drawing Sheets

(56) References Cited

U.S. PATENT DOCUMENTS

| | | | | |
|---|---|---|---|---|
| 2010/0049885 A1* | 2/2010 | Chandra | ................ | H04L 45/62 |
| | | | | 710/36 |
| 2013/0322434 A1* | 12/2013 | Armbruster | ....... | H04L 12/40006 |
| | | | | 370/362 |
| 2016/0147628 A1* | 5/2016 | Arroyo | ............... | G06F 11/3041 |
| | | | | 714/43 |

OTHER PUBLICATIONS

Wikipedia, Adapter (computing), Mar. 3, 2020, pp. 1-5.*
https://en.wikipedia.org, "Intelligent Platform Management Interface" (see Baseboard Management Controller), 8 pages, printed Jan. 27, 2020.
https://en.wikipedia.org, "IBM Remote Supervisor Adapter" (see Integrated Management Module), 5 pages, printed Jan. 27, 2020.

* cited by examiner

COMPUTER HAVING AN EMBEDDED SWITCH

BACKGROUND

The present disclosure relates to a computer that provides multiple network communication links to a central processing unit and a management processor within the computer.

BACKGROUND OF THE RELATED ART

The Internet of Things (IoT) is a network of physical devices with embedded electronics, software, sensors, actuators and connectivity that enables these physical devices to connect, collect and exchange data. The Internet of Things is driving new demand for computing outside the Data Center. The concept of IoT is based on data collection, data analysis and taking intelligent action as a result of the analysis. A typical IoT framework focuses on data collection and forwarding. For example, an IoT end point device, such as an intelligent camera, or a gateway device collects data from one or more sensors and forwards the collected data to the cloud where most of the data processing is performed. In other words, computing devices at the edge of the IoT environment manage data collection and forwarding functions of the system, and the computing devices in the cloud manage the data analysis and data storage functions.

BRIEF SUMMARY

One embodiment provides a computer comprising a central processing unit, a management processor, a first network adapter, a second network adapter, and an embedded switch. The embedded switch includes a port coupled to the central processing unit, a port coupled to the management processor, a port coupled to the first network adapter, and a port coupled to the second network adapter. Furthermore, the embedded switch provides both the central processing unit and the management processor with access to an external network using a selected one of the first and second network adapters. Optionally, the computer may include additional network adapters.

Another embodiment provides a computer program product comprising non-transitory computer readable storage media having program instructions embodied therewith for controlling operation of a switch embedded within a computer. The program instructions are executable by a processor of the embedded switch to select one of a plurality of network adapters coupled to the embedded switch for handling communications with an external network, wherein the plurality of network adapters differ by at least one of a transmission medium and a transmission speed. The program instructions are further executable by the processor of the embedded switch to direct communications between a central processing unit of the computer and the external network through the selected network adapter, direct communications between a management processor of the computer and the external network through the selected network adapter, and direct communications between the central processing unit and each of a plurality of external endpoint devices, wherein the communications with each external endpoint device among the plurality of external endpoint devices use any of the plurality of network adapters that are able to establish a connection with the external endpoint device.

DETAILED DESCRIPTION

Figure 1:
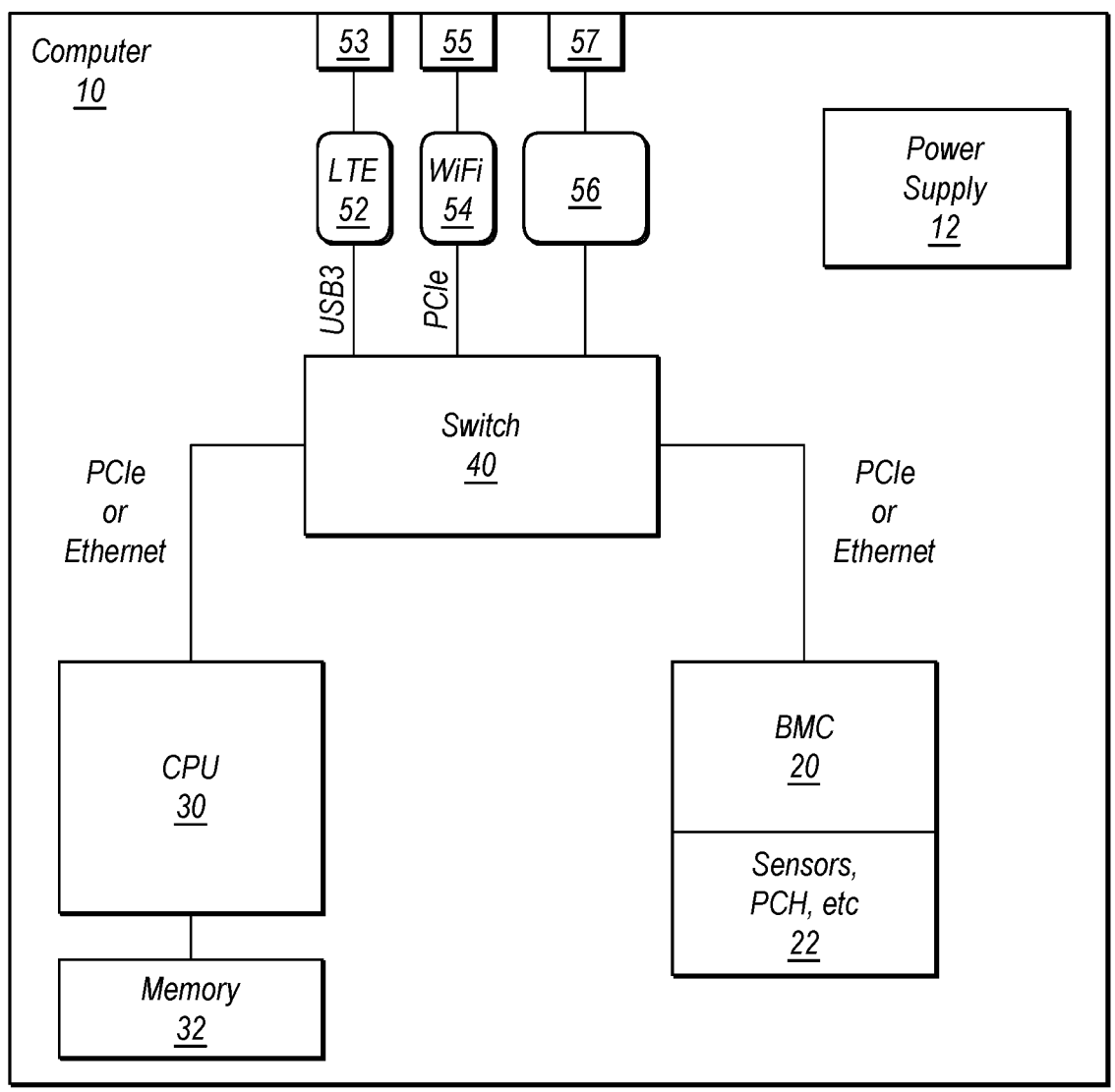
FIG. 1 is a diagram of one embodiment of a computer having an embedded switch that provides wired and wireless network connections to a central processing unit (CPU) and a management processor, such as a baseboard management controller (BMC).

One embodiment provides a computer comprising a central processing unit, a management processor, a first network adapter, a second network adapter, and an embedded switch. The embedded switch includes a port coupled to the central processing unit, a port coupled to the management processor, a port coupled to the first network adapter, and a port coupled to the second network adapter. Furthermore, the embedded switch provides both the central processing unit and the management processor with access to an external network using a selected one of the first and second network adapters. Optionally, the computer may include additional network adapters.

The computer may have any known computer architecture in addition to the referenced central processing unit, management processor, first network adapter, second network adapter, and embedded switch. However, the switch may be referred to as an embedded switch because it is integrated into the architecture of the computer such that the central processing unit (CPU) and the management processor, such as a baseboard management controller (BMC) or integrated management module (IMM), access an external network through the switch. The computer preferably includes a motherboard that secures the central processing unit, the management processor and the embedded switch. In one option, the central processing unit and the management processor are each coupled to the embedded switch via a high-speed serial computer bus, such as a bus consistent with the Peripheral Component Interconnect Express (PCIe) bus standard. In a further option, the central processing unit and the management processor may each communication with the embedded switch using a standard wired network protocol, such as an Ethernet protocol. The connection between the CPU and the switch, as well as the connection between the management processor and the switch, may either be a direct interconnect from the CPU or BMC to the switch or an indirect interconnect from the CPU or BMC through a network card to the switch.

The embedded switch controls all communications between the CPU and the external network as well as all communications between the management processor and the external network. Furthermore, the embedded switch may also be referred as being independent of the CPU and the management processor because the switch can provide network communications to both the CPU and the management processor without being dependent upon either the CPU or the management processor. In other words, the failure of the CPU does not prevent the management processor from gaining access to the external network through the embedded switch and failure of the management processor does not prevent the CPU from gaining access to the external network through the embedded switch. Furthermore, the switch may run device drivers for any of the network adapters such that the network adapters remain operational even if the CPU fails and/or an operating system (OS) being run on the CPU fails.

The computer includes multiple network adapters coupled to the embedded switch, such as a first network adapter and a second network adapter. However, the computer may include any number of additional network adapters. In one option, the multiple network adapters are each a different type of network adapter, where the network adapters may differ by at least one of a transmission medium and a transmission speed. In a non-limiting example of a different transmission medium, the first network adapter may be a wireless network adapter and the second network adapter may be a wired network adapter. In a non-limiting example of a different transmission speed, the first network adapter may be a wireless local area network adapter and the second network adapter may be a wireless mobile telecommunication network adapter.

The computer further includes a power supply coupled to the central processing unit, management processor, the embedded switch, and the first and second network) adapters in order to supply power thereto. In one embodiment, the power supply provides standby power to the embedded switch, the management processor and one or more of the network adapters even if power to the central processor is turned off. Accordingly, the management processor is able to run and to communicate through the embedded switch and one of the network adapters to reach the external network so long as the power supply is plugged into a power source. Since the computer has a management processor or other management functionality that is always on and can always reach the external network for communication with a remote management node, the computer can be remotely managed. Remote management is important since the computers at the edge of the IoT environment may be deployed across numerous disperse locations, such that it is impractical to provide an information technology (IT) expert to manage the computers. By implementing remote management in the edge computer, an IT expert can work from a central location to manage any number of the edge computer(s) deployed at any number of locations.

The computer may support server class platform management even if the computer does not have a wired network connection available. Servers in a datacenter rely upon a wired network connection for both a data network and a management network, but this infrastructure cannot be assumed to be available in all of the various locations where there may be IoT endpoints. Embodiments of the computers described herein may enable server class platform management even if the local IoT environment only has a wireless network connection. For example, a business office, parts warehouse or personal residence may only have a wireless local area network. Furthermore, the computer may have a wide variety of form factors and capabilities, such as a notebook computer, tablet computer, mobile phone, automotive computer, or smart television.

Another embodiment provides a computer program product comprising non-transitory computer readable storage media having program instructions embodied therewith for controlling operation of a switch embedded within a computer. The program instructions are executable by a processor of the embedded switch to select one of a plurality of network adapters coupled to the embedded switch for handling communications with an external network, wherein the plurality of network adapters differ by at least one of a transmission medium and a transmission speed. The program instructions are further executable by the processor of the embedded switch to direct communications between a central processing unit of the computer and the external network through the selected network adapter, direct communications between a management processor of the computer and the external network through the selected network adapter, and direct communications between the central processing unit and each of a plurality of external endpoint devices, wherein the communications with each external endpoint device among the plurality of external endpoint devices use any of the plurality of network adapters that are able to establish a connection with the external endpoint device.

The program instructions executable by a processor to select one of a plurality of network adapters coupled to the embedded switch for handling communications with an external network, may include program instructions executable by a processor to select the one of the plurality of network adapters that is currently providing the fastest available link to the external network. While the fastest available link provides the benefit of speed, alternative embodiments may select one of the plurality of network adapters using an alternative criteria, such as reliability or percent up time. In one example where the plurality of network adapters includes a wireless network adapter and a wired network adapter, the wired network adapter may be initially selected on the basis of having a greater speed or bandwidth yet an increasing load on the wired network may lead to a temporary or occasional selection of the wireless network adapter on the basis that the wireless network can currently provide a greater speed or bandwidth. In another example, the plurality of network adapters may include a wireless local area network adapter and a wireless mobile telecommunication network adapter.

Embodiments of the computer may be installed in an IoT environment near one or more external endpoint devices. In such an installation or application, the communications between the central processing unit and the plurality of external endpoint devices may include sensor data received from the external endpoint devices. The type of sensor data is not limited and will vary from one sensor or device to another sensor or device. For example, one endpoint device may be a smart oven having a temperature sensor that provides temperature data and a timer that provides remaining cook time data. In another example, an endpoint device may be an industrial actuator having a voltage sensor that provides voltage data and a position sensor that provides position data. In a further example, an endpoint device may be a flow meter having a flow rate sensor that provides flow rate data. Other non-limiting examples of endpoint devices may include smart televisions, wearable devices, smart appliances, home security systems, thermostats, industrial automation and control systems, and the like. Depending upon the type of endpoint devices present at a given location, the communications between the central processing unit and one of the plurality of external endpoint devices may further include a control instruction sent from the central processing unit to the external endpoint device.

The communication between the computer and the one or more external endpoint devices may pass through one or more gateway devices, since the sensors may use a wide variety of communication protocols and transmission mediums. Accordingly, the sensors may communicate directly with a gateway device using any of a wide variety of protocols, which may include proprietary protocols unique to the individual sensors. Accordingly, the IoT gateway device or multiple IoT gateway devices may aggregate information from one or more IoT endpoint devices, then communicate that information to the computer using any of the standard network protocols that are available to the computer. In certain embodiments, the computer may implement multiple standard network protocols, such as Ethernet, TCP/IP, WiFi or LTE.

In a further embodiment, the program instructions may be further executable by the processor of the embedded switch to logically bundle each of the links provided by the plurality of network adapters between the embedded switch and an external network, wherein only one of the bundled links supports communication with the external network at any given point in time. Still further, the program instructions may be executable by the processor of the embedded switch to detect failure of a link provided by the selected network adapter and automatically select a different one of the network adapters for handling communications with the external network in response to detecting failure of the currently selected one of the bundled links. Such a process may be referred to as a "failover" between links.

In yet another embodiment, the program instructions may be further executable by the processor of the embedded switch to logically cluster the computer with a second) computer having a second embedded switch and a second plurality of network adapters coupled to the second embedded switch. Even further, the program instructions may be executable by the processor of the switch to designate one of the embedded switches to handle network communications for the clustered computers, direct communications between any of the clustered computers and the external network through the designated embedded switch, and automatically designate a different one of the embedded switches of the clustered computers to handle network communications for the clustered computers in response to detecting failure of a component of the computer including the designated embedded switch, wherein the components is selected from the central processing unit, the management processor and the embedded switch. Such a process may be referred to as a "failover" between the embedded switches of a cluster of computers. The embedded switch that is currently designated to handle network communication for the clustered computers may be referred to as the "active" switch. To facilitate the use of an active switch for the cluster, the designated embedded switch may use a virtual network address to handle network communications for the clustered computers, wherein each embedded switch within the cluster uses a separate network address for communications with the designated embedded switch. Optionally, the virtual network address may be selected from a virtual media access control address and a virtual internet protocol address.

In yet another embodiment, the program instructions may be further executable by the processor of the embedded switch to provide network property information to the plurality of network adapters. Accordingly, each of the plurality of network adapters, or at least the selected network adapter, may be fully booted to reach an operational state even without booting the central processing unit. Therefore, the standby power provided to the management processor, embedded switch and network adapters is sufficient to establish a network connection so that the management processor can communicate with a remote management node.

Embodiments of the computer are suitable as an edge computer in an IoT system and enable use of a management network. The edge computer is closer to the endpoint devices and may perform some amount of processing and analysis of the data collected from physical endpoint devices without experiencing the amount of latency that) is incurred to access the cloud. Optionally, the local edge computer may also perform some aspect of control over the physical endpoint devices. Using compute resources close to the IoT endpoint devices may lead to a higher level of computing availability (enabling mission-critical applications to be run on the edge computer), a lower level of latency (improving response and control using the edge computer), and a higher level of security and privacy protection (reducing the amount of critical information being transmitted over the network).

The foregoing computer program products may further include program instructions for implementing or initiating any one or more aspects of the methods described herein. Accordingly, a separate description of the methods will not be duplicated in the context of a computer program product. Similarly, the apparatus or system may further process the program instructions to implement or initiate any one or more aspects of the methods described herein.

FIG. 1 is a diagram of one embodiment of a computer 10 having an embedded switch 40 that provides wired and wireless network connections to a central processing unit (CPU) 30 and a management processor 20, such as a baseboard management controller (BMC). The switch 40 is embedded within the computer 10 in the sense that the switch is integrated into the input/output capabilities of the computer 10. If the computer 10 has a housing or enclosure containing the CPU 30 and the management processor 20, then the embedded switch 40 may be contained within the housing or enclosure. The embedded switch 40 may be secured to a motherboard that secures the CPU 30 and the management processor 20, or the embedded switch may be secured to an adapter card that is itself secured into a card slot on the motherboard that secures the CPU 30 and the management processor 20. As used herein, the term "switch" is intended to encompass a router. The CPU 30 is shown coupled to memory 32 and the management processor 20 is shown coupled to various onboard sensors, a platform controller hub (PCH) or southbridge chip 22.

The embedded switch 40 is also coupled to a plurality of network adapters. In the embodiment shown, the embedded switch 40 is coupled to a wireless mobile telecommunication network adapter 52, a wireless local area network adapter 54 and a) wired network adapter 56. In the non-limiting example shown, the wireless mobile telecommunication network adapter 52 may implement a Long-Term Evolution (LTE) wireless mobile communication standard, the wireless local area network adapter 54 may implement the WI-FI standard, and the wired network adapter 56 may implement the Ethernet standard, such as Gigabit Ethernet (GbE) or 10 Gigabit Ethernet (10 GbE). The wireless mobile telecommunication network adapter 52 includes an antenna 53, the wireless local area network adapter 54 includes an antenna 55, and the wired network adapter 56 includes a cable connector 57.

The embedded switch 40 is coupled to the CPU(s) 30 and the management processor 20 in order to direct communications between those devices 30, 20 and an external network (not shown) using one or more of the network adapters 52, 54, 56. The embedded switch 40 may be referred to as having a number of input/output "ports", but these ports include connections of any type. For example, a port coupling the CPU 30 to the embedded switch may be a permanent channel or bus that extends from the CPU to the embedded switch without any intermediate components or connections. As another example, a port coupling a network adapter to the embedded switch may, without limitation, be a channel or bus that extends from the embedded switch to an expansion slot where an expansion card that implements the network adapter may be selectively secureable. Other configurations of a port may be envisioned and implemented by the embedded switch for establishing or maintaining an input/output connection with a device.

The embedded switch 40 is operational independent of whether the CPU 30 and/or the BMC 20 are currently operational. Since the embedded switch 40 is not dependent upon either the CPU 30 or the BMC 20, the switch may provide network access to either one of the CPU and the BMC even if the other one of the CPU and BMC has not yet booted or has failed. The computer 10 may be deployed in various locations of an IoT environment and may be beneficially deployed at the edge of an IoT network where one or more endpoint devices are in operation. Unlike a data center where a data network and a platform management (BMC) network tend to be separate wired networks, the network infrastructure available to an edge computer may be very different. For) example, the edge computing environment may have a wireless network as the only network connection available for both data and platform management.

The wired and wireless network adapters sit behind the embedded switch, such that the network adapters may be abstracted for the CPU and the BMC. Advantageously, the CPU and the BMC do not need to include separate device drivers for the wireless device. Rather, the embedded switch may have a single device driver to operate the one wireless device coupled to the embedded switch. Using the embedded switch to load the device drivers for the network adapters provides greater wired/wireless independency from the platform (i.e., the CPU and the OS).

Furthermore, the embedded switch 40, the management processor 20, and the network adapters 52, 54, 56 preferably receive standby power from a power supply 12, where standby power enables these components to be operational even when main power from the power supply 12 to the computer 10 has not been turned on. Accordingly, the computer 10 is able to be remotely managed so long as the power supply has been plugged into a power source. In one embodiment, the embedded switch can also manage network property information, such as WiFi credentials, but in another embodiment the BMC may program the property information through a link between the BMC and the switch. In either of these two embodiments, one or more of the network adapters may be brought up and connected with the external network without reliance upon the CPU to load device drivers associated with the operating system. The computer may also communicate with external endpoints using any of the wired or wireless network adapters as discussed further in reference to FIG. 2.

In various embodiments of the edge computer, the embedded switch 40 may bundle the various wired and wireless links as a single logical entity and provide flexible failover among the links within the bundle. This bundling may be controlled in an active-standby fashion whereby only one of the links is active for sending and receiving communications at any given point in time. While there is some potential benefit to operating the bundle of links in an active-active fashion where all links are used to share the traffic and increase the total available link bandwidth, this may be impractical because the links within the bundle use distinct media (i.e., wired versus wireless) and) presumably will have different speeds. Accordingly, when the active link fails, a failover may occur in an active-standby fashion between an active link and a standby link, such as between a wired link and a wireless link, or between two wireless links having different protocols (WiFi and LTE). For example, when the wired link or the WiFi link fails (i.e., the active link), the embedded switch can automatically cause communications to failover to the LTE link (i.e., a standby link), which may have a wider coverage but may be more expensive. The failover of one link to another link should not impact the workload of the CPU or the BMC, since the embedded switch will relay network communication to or from a virtual media access control (MAC) address or virtual internet protocol (IP) address. Bundling of the links provides redundancy between two links with different physical characteristics i.e. wired and wireless links, where the two interfaces (wired and wireless) employ the same virtual MAC address or virtual IP address.

In one option, the wired link may be designated as the primary active link of the bundle by default. All network traffic to the computer should flow through the active link at all times. If the primary active link goes down, then the primary active link may failover to one of the standby links, which then becomes the new active link. The wired link may often be the preferred primary active link because a wired link typically provides greater performance and reliability than a wireless link. However, if a given edge environment has a wireless link with greater performance and reliability than a wired link, or if the edge environment does not have a wired link, then the primary active link may be a wireless link. Although the edge computer may have multiple wired and wireless links available, those links are generally not suitable for traditional link aggregation, because link aggregation typically only involves links that operate at the same speed and have the same physical characteristics.

Figure 2:
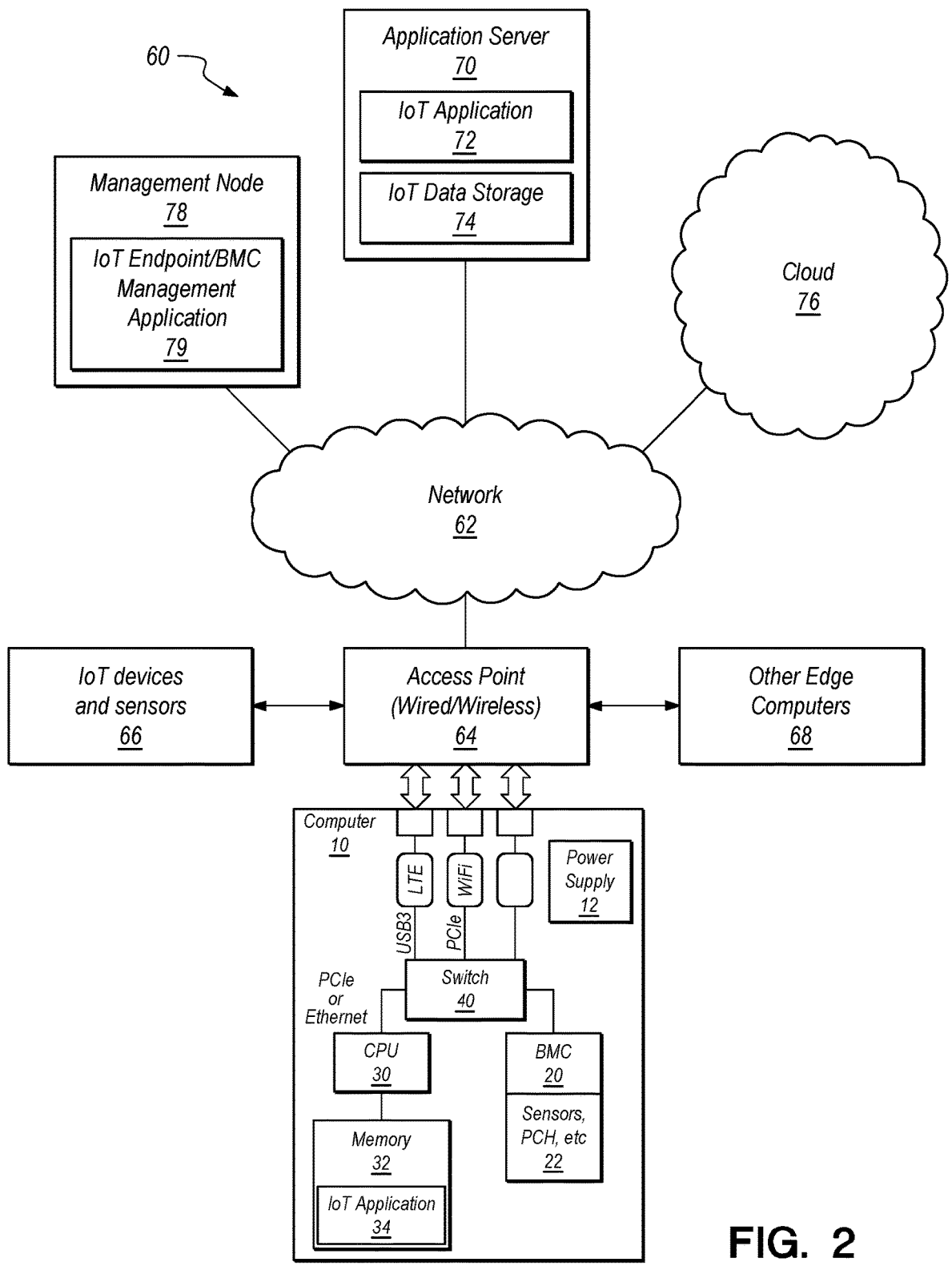
FIG. 2 is a diagram of a system that includes the computer of FIG. 1 as an edge computer for performing various processes in an Internet of Things (IoT) environment.

FIG. 2 is a diagram of a system 60 that includes the computer 10 of FIG. 1 as an edge computer for performing various processes in an Internet of Things (IoT) environment. The computer 10 may use its wired and/or wireless network adapters 52, 54, 56 to access a network 62 through a wired and/or wireless access point 64. The access point 64 may also be used to facilitate communication with one or more IoT devices and sensors 66 as well other edge computers 68 that may be similar or identical to the computer 10.

The computer 10 may communicate with the IoT devices and sensors 66 using any available wired or wireless communication media, transmission speed and protocol. Since the computer 10 includes a wireless mobile telecommunication network adapter 52, a wireless local area network adapter 54 and a wired network adapter 56, the computer 10 can communicate with any IoT device or sensor that can communicate in a manner compatible with at least one of these adapters. Similarly, the computer 10 may communicate with any of the optional other edge computers 68.

The computer 10 includes a CPU 30 with access to memory 32 that may store an IoT application 34 for handling various communications with the IoT devices and sensors 66. For example, the IoT application 34 may be executed by the processor to monitor sensor data received from the IoT devices and sensors 66. Furthermore, the IoT application 34 may be executed by the processor to provide a control signal to any one or more of the devices and sensors 66 in response to sensor data received from any one or more of the devices and sensors 66. Since the computer 10 may be located along the edge of the IoT environment or system 60, the computer 10 may monitor and process sensor data from the IoT devices and sensors 66 with low latency and high availability.

The computer 10 may also communicate over the network 62 with an application server 70 that may run an IoT application 72 and provide for IoT data storage 74. The IoT application 72 may monitor and process various IoT data and take various actions. For example, the IoT application 72 may receive sensor data directly from one or more of the IoT devices and sensors 66 or indirectly from the computer 10 or other edge computers 68. Similarly, the IoT application 72 may receive processed sensor data, such as averages, highs, lows and alerts, from the computer 10 or other edge computers 68, or notifications of actions taken by the computer 10 or other edge computers 68. The IoT application 34 run by the computer 10 at the edge of the system 60 near the IoT devices and sensors 66, and the IoT application 72 run by the application server 70 across the network 62 from the IoT devices and sensors 66, may divide up the desired data processing tasks in any suitable manner. Processing that benefits from low latency and high availability is preferably performed by the edge computer 10, whereas processing that does not required low latency or high availability may, in some instances, be preferably performed by the application server 70. Still further, the system 60 may) include a cloud 76, which is a shared pool of computer system resources. Accordingly, the computer system resources of the cloud 76 may supplement or substitute for the application server 70 and perform services similar or identical to the IoT application 72 and IoT data storage 74.

As discussed above in reference to FIG. 1, the management processor or BMC 20 supports remote management of the computer 10. The BMC 20, embedded switch 40, and one or more of the network adapters 52, 54, 56 receive standby power form the power supply 12 and may communicate over the network 62 even if main power to the computer is not turned on. In the system 60 of FIG. 2, the BMC 20 may communicate with a remote management node 78. The management node 78 may run an application 79, such as an IoT endpoint and BMC management application, to communicate with the BMC 20 of the computer 10 and, optionally, with other edge computers 68 and/or the application server 70. Accordingly, the remote management node 78 may apply new settings, firmware updates and the like to the BMC 20, and the BMC 20 may report operational and performance data about the computer 10 to the remote management node 78.

Figure 3:
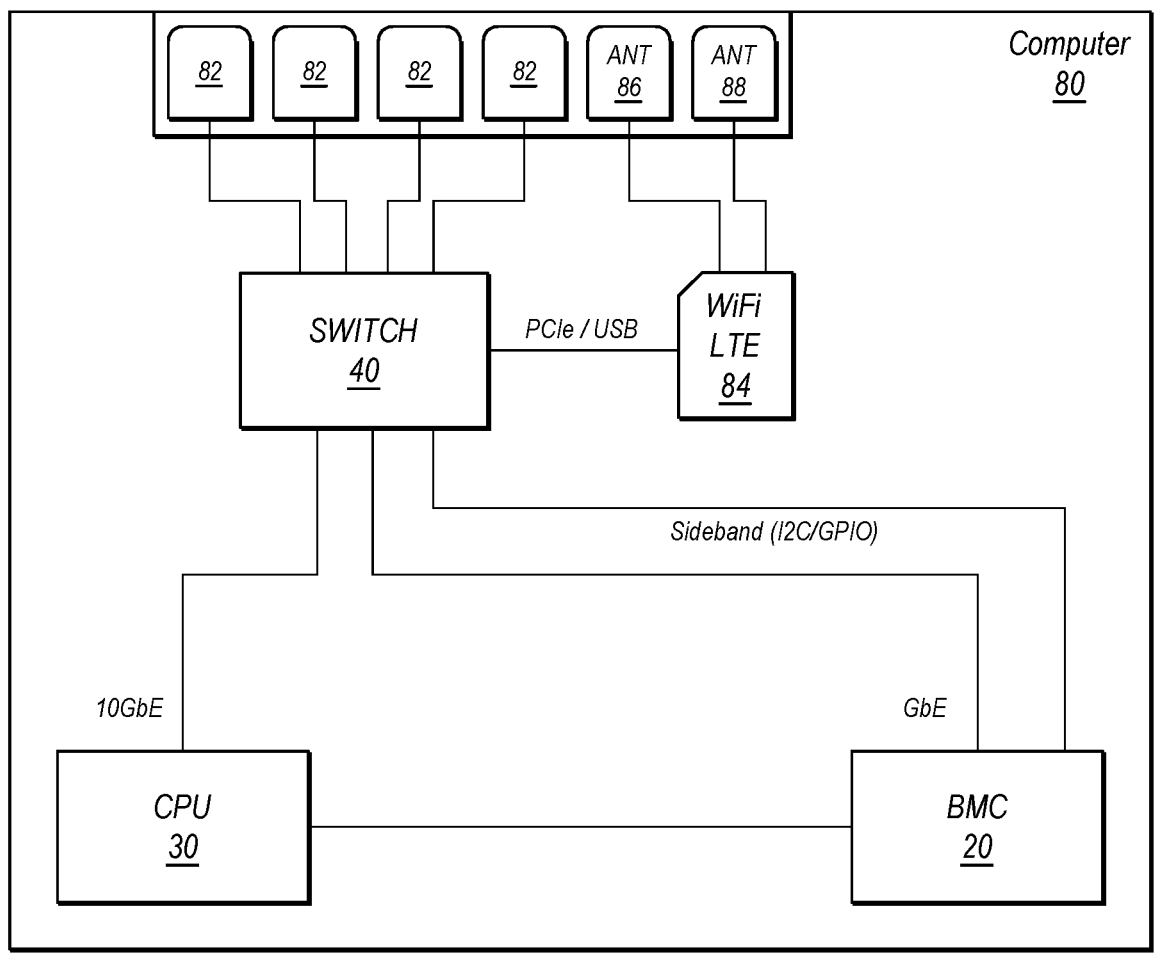
FIG. 3 is a diagram of another embodiment of a computer having an embedded switch that provides wired and wireless network connections to a central processing unit (CPU) and a management processor, such as a baseboard management controller (BMC).

FIG. 3 is a diagram of another embodiment of a computer 80 having an embedded switch 40 that provides wired and wireless network connections to a central processing unit (CPU) 30 and a management processor 20, such as a baseboard management controller (BMC). The architecture and operation of the computer 80 may be the same as that described above for the computer 10 of FIGS. 1 and 2, except that FIG. 3 provides additional details of a particular embodiment. In this embodiment, the embedded switch 40 has multiple wired connectors 82, such as registered jack (RJ) connectors (i.e., RJ45 connectors) or small form-factor pluggable (SFP) connectors, to facilitate a wired link with an access point, IoT device or other edge computer. The wired network adapter functionality may be built into the embedded switch 40. A single module 84 may implement both the wireless mobile telecommunication network adapter (LTE) and the wireless local area network adapter (Wi-Fi). As shown the module 84 is coupled to the embedded switch 40 via a PCIe bus or universal serial bus (USB). Furthermore, the module 84 is connected to two antennas, such as a wireless mobile telecommunication antenna 86 and a wireless local area network antenna 88.

The BMC can manage the wireless device, for example, through a software agent running on the embedded switch. In one embodiment, the BMC can access the wireless device, for example through an Inter-Integrated Circuit (I2C) bus or using a Management Component Transport Protocol (MCTP), to take an inventory of devices coupled to the embedded switch, update firmware when required, and recover to a confirmed status when a device has stopped working. However, since the switch manages network traffic through the wired and wireless links, each wireless device is visible to the system CPU. Therefore, in another embodiment, the embedded switch may directly manage the device inventory, firmware update, and recovery functions for the wireless modules, and the BMC may indirectly manage such devices through the switch. In this design, BMC may directly manage the power and thermal aspects of the switch through an inter-integrated circuit (I2C) bus and a general purpose input output (GPIO) pin of the BMC, and the other wireless functions can be managed indirectly via the switch.

Figure 4:
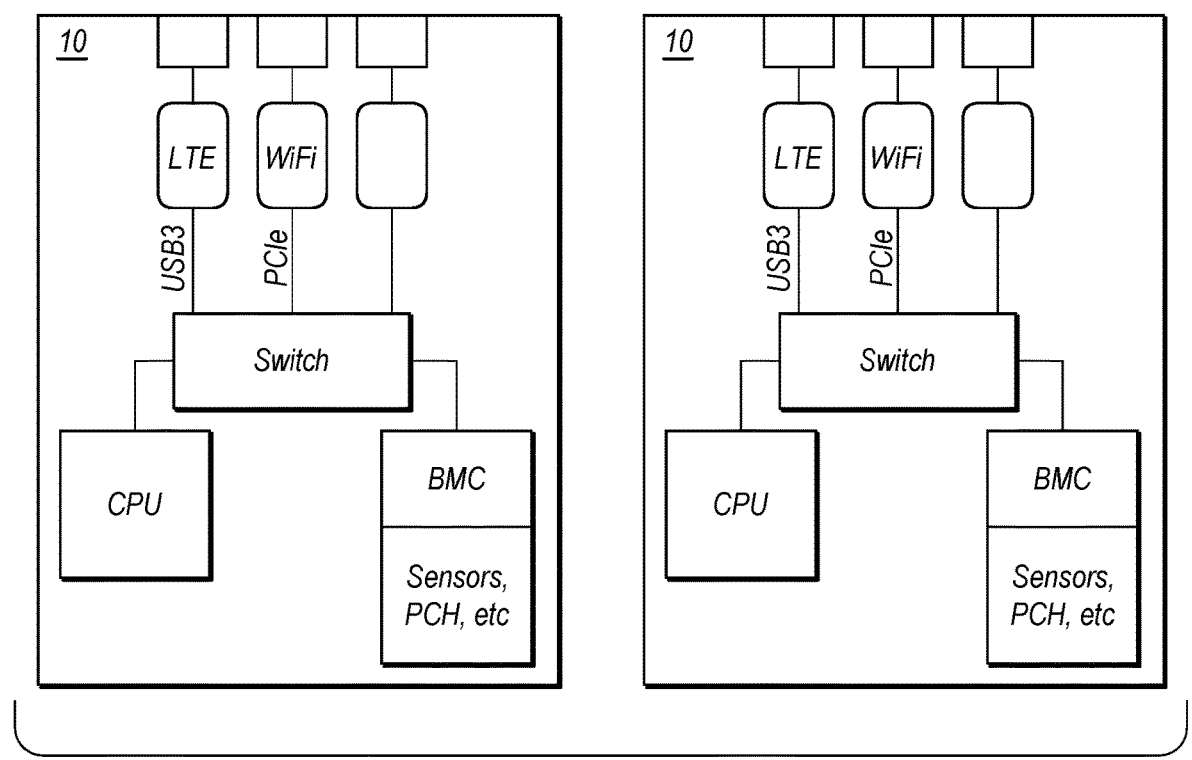
FIG. 4 is a diagram of two of the computers of FIG. 1 which may be logically clustered.

FIG. 4 is a diagram of two of the computers 10 of FIG. 1 which may be logically clustered. In one embodiment, multiple edge computers (i.e., computing nodes) may be clustered to implement a high availability (HA) protocol, such as the Virtual Router Redundancy Protocol (VRRP). During operation of the computing nodes 10, it is possible that one of the clustered nodes will experience a CPU failure or a BMC failure. Accordingly, when one of the clustered computing nodes experiences such a failure, both the wired and wireless network connections can failover across the computing nodes, where the link failover may provide a continued network connection to both the data network and the management network for both of the computers. The switches of the clustered nodes may support the failover using virtual MAC and IP addresses.

In order to support the failover within a cluster of nodes, the embedded switch of the failed node must remain operational in order to enable continued communication between the failed node and at least one other node in the same cluster. For example, in a cluster that includes a first node and a second node, if the CPU of the first node fails then the embedded switch of the first node can communicate with the embedded switch of the second node to report the occurrence of the CPU failure. Furthermore, the BMC of the first node can still communicate with the management network through the first embedded switch. Similarly, if the BMC of the first node fails, the embedded switch of the first node can communicate with the embedded switch of the second node to report the occurrence of the BMC failure, and the CPU of the first node can still communicate with the data network through the first embedded switch.

If the connectivity of the clustered nodes fails due to the failure of the active switch in a first node, then a switch embedded in a second node within the cluster will determine that the first node is down or unavailable and may take over as the active switch for the cluster. In this manner, each of the clustered nodes other than the node with the failed switch will remain connected to the network. In a preferred embodiment, the embedded switches may apply a predetermined criteria to determine which of the remaining switches in the cluster of nodes will have higher priority to assume the role of the active switch for the cluster. Switch connectivity issues may arise from various causes, such as the active link of the active switch going down, the entire active switch going down such that all links go down, and the active switch running unstable software that prevents sending keep-alive packets.

The terms "Virtual MAC and Virtual IP" refer to logical shared resources (i.e. MAC address or IP address). In reference to FIG. 4, the two nodes may be clustered and the cluster may be assigned a Virtual MAC address and a Virtual IP address to support network communication to and from the cluster. During network communications, the active switch of the cluster will use a virtual address as the source address, which is shared by the two clustered nodes or devices. Each embedded switch within the cluster will still have its own IP address while the cluster will have a virtual IP address. Network devices outside the cluster will only be aware of the virtual IP address and will use the virtual IP address to communicate with the cluster. Inside the cluster, only the active switch will send and receive packets over the network using the virtual IP address. If the active switch goes down for one reason or another, a backup/standby switch embedded in another node within the cluster will take over as the active switch and will then become responsive to network packets having the virtual IP address as the destination. Packets received by the active switch are then forwarded to the destination node using the IP address of the appropriate node.)

Figure 5:
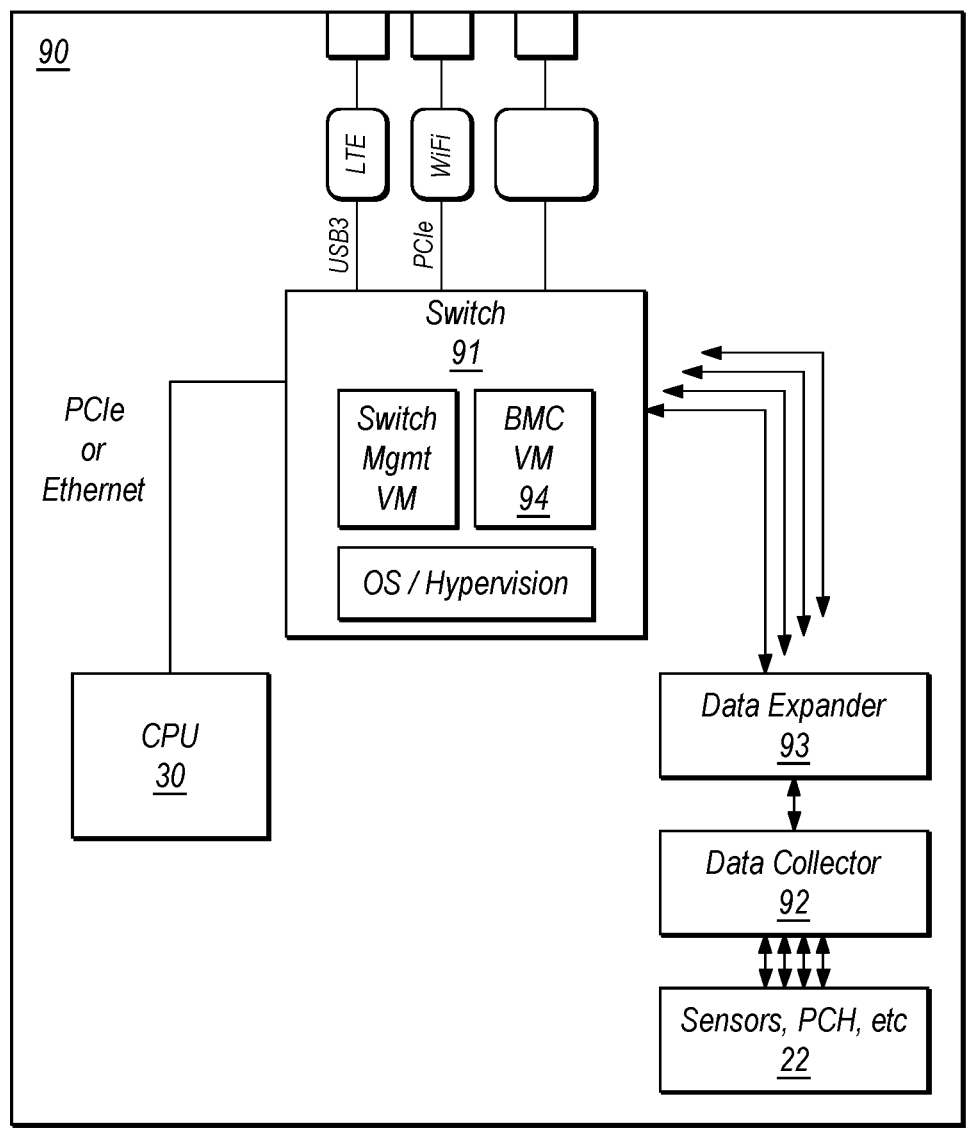
FIG. 5 is a diagram of yet another embodiment of a computer having the functionality of a management processor, such as a baseboard management controller (BMC), implemented by the embedded switch.

FIG. 5 is a diagram of yet another embodiment of a computer 90 where the functionality of a management processor, such as a baseboard management controller (BMC), is implemented by the embedded switch 91. In the embodiment shown, the BMC 20 that was shown in FIG. 1 has been replaced with a first field-programmable gate array (FPGA) 92 that functions as a data collector to collect data from the platform sensors 22. The first FPGA 92 forwards the data over a high speed communication link to a second field-programmable gate array (FPGA) 93 that is located physically closer to the embedded switch 91, where the second FPGA functions as a data expander to expand the link and provide the signals to the embedded switch 91. For example, the first FPGA 92 may perform packetization of the platform sensor data and the second FPGA 93 may perform depacketization of the platform sensor data. The BMC firmware code may be provided to and implement by the embedded switch 91 (e.g. as a container or a virtual machine 94), such that the management software can act with deeper knowledge of the network and the current operation of the network. For example, with the BMC functionality 94 incorporated into the embedded switch 91, the BMC functionality may take appropriate actions depending on whether a packet comes from a wired or wireless connection. Furthermore, integrating the BMC functionality into the embedded switch allows embodiments to reduce the amount of redundant management functions of the BMC and the switch. Therefore, this embodiment may be more flexible (e.g. seamless BMC wireless access), robust (e.g. wired/multiple wireless failover), network aware (e.g. BMC's function based on requesting network source), and cost efficient (e.g. BMC chip reduction).

Figure 6:
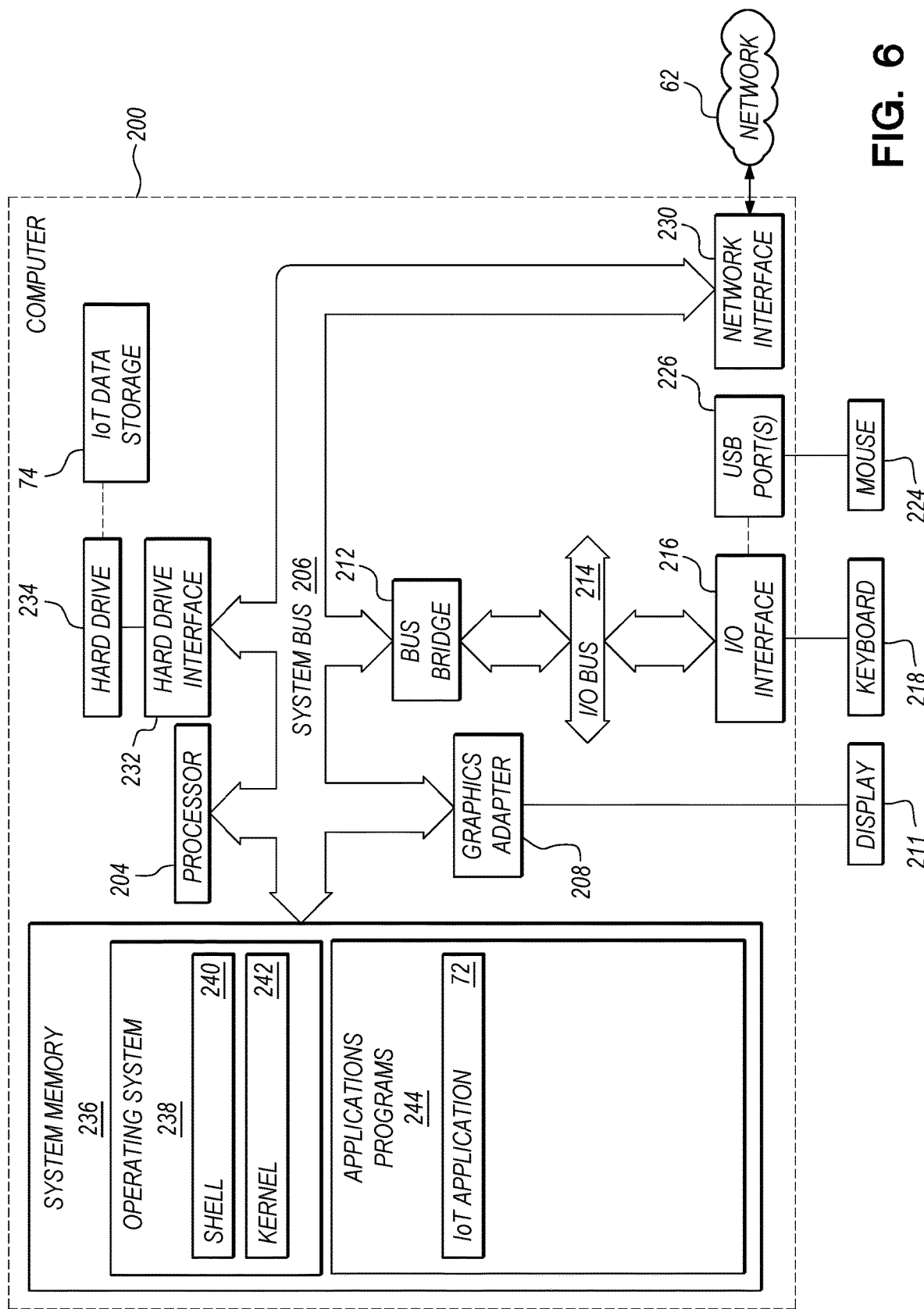
FIG. 6 is a diagram of a computer that is representative of the application server and management node of FIG. 2, and may also be representative of many aspects of the edge computer of FIG. 2 that are not shown in FIG. 2.

FIG. 6 is a diagram of a computer 200 that is representative of optional architecture of the application server 70 and management node 78 of FIG. 2, and may also be representative of many aspects of the edge computer 10 of FIG. 2 that are not shown in FIG. 2. In the following description, the computer 200 will be described in the context of the application server 70.

The computer 200 includes a processor unit 204 that is coupled to a system bus 206. The processor unit 204 may utilize one or more processors, each of which has one or more processor cores. A graphics adapter 208, which drives/supports the display 211, is also coupled to system bus 206. The graphics adapter 208 may, for example, include a graphics processing unit (GPU). The system bus 206 is coupled via a bus bridge 212 to an input/output (I/O) bus 214. An I/O interface 216 is coupled to the I/O bus 214. The I/O interface 216 may facilitate communication with various I/O devices, such as a keyboard 218 (such as a touch screen virtual keyboard) and a USB mouse 224 via USB port(s) 226 (or other type of pointing device, such as a trackpad). As depicted, the computer 200 is able to communicate with other network devices over the network 62 using a network adapter or network interface controller 230. For example, the computer 200 may communicate with one or more edge computers and one or more IoT devices or sensors.

A hard drive interface 232 is also coupled to the system bus 206. The hard drive interface 232 interfaces with a hard drive 234. In a preferred embodiment, the hard drive 234 communicates with system memory 236, which is also coupled to the system bus 206. System memory is defined as a lowest level of volatile memory in the computer 200. This volatile memory includes additional higher levels of volatile memory (not shown), including, but not limited to, cache memory, registers and buffers. Data that populates the system memory 236 includes the operating system (OS) 238 and application programs 244. Optionally, the hard drive 234 may include IoT data storage 74. The hardware elements depicted in the computer 200 are not intended to be exhaustive, but rather are representative. For instance, the computer 200 may include non-volatile memory and the like.

The operating system 238 includes a shell 240 for providing transparent user access to resources such as application programs 244. Generally, the shell 240 is a program that provides an interpreter and an interface between the user and the operating system. More specifically, the shell 240 executes commands that are entered into a command line user interface or from a file. Thus, the shell 240, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. Note that while the shell 240 may be a text-based, line-oriented user interface, embodiments may support other user interface modes, such as graphical, voice, gestural, etc.

As depicted, the operating system 238 also includes the kernel 242, which includes lower levels of functionality for the operating system 238, including providing essential services required by other parts of the operating system 238 and application programs 244. Such essential services may include memory management, process and task management, disk management, and mouse and keyboard management. As shown, the computer 200 includes application programs 244 in the system memory of the computer 200, including, without limitation, an IoT application 72. The computer 200 may execute and run the IoT application 72 to control communications with the edge computer and IoT devices and sensors, as well as data storage functions.

As will be appreciated by one skilled in the art, embodiments may take the form of, or include, a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program) instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computer, comprising:
a central processing unit;
a management processor;
a first network adapter;
a second network adapter;
an embedded switch including a port coupled to the central processing unit, a port coupled to the management processor, a port coupled to the first network adapter, and a port coupled to the second network adapter, wherein the embedded switch provides both the central processing unit and the management processor with access to an external network using a selected one of the first and second network adapters; and
a power supply coupled to the central processing unit, management processor, the embedded switch, and the first and second network adapters, wherein the power supply provides standby power to the embedded switch, the management processor and one or more of the network adapters even if power to the central processing unit is turned off.

2. The computer of claim 1, wherein the first network adapter is a wireless network adapter and the second network adapter is a wired network adapter.

3. The computer of claim 1, wherein the first network adapter is a wireless local area network adapter having an antenna and the second network adapter is a wireless mobile telecommunication network adapter having an antenna.

4. The computer of claim 1, wherein the central processing unit and the management processor are coupled to the embedded switch for communication using a standard wired network protocol.

5. The computer of claim 4, wherein the standard wired network protocol is an Ethernet protocol.

6. The computer of claim 1, further comprising:
a motherboard that secures the central processing unit, the management processor and the embedded switch.

7. A computer, comprising:
a central processing unit a management processor;
a first network adapter;
a second network adapter;
an embedded switch including a port coupled to the central processing unit, a port coupled to the management processor, a port coupled to the first network adapter, and a port coupled to the second network adapter, wherein the embedded switch provides both the central processing unit and the management processor with access to an external network using a selected one of the first and second network adapters, wherein the first network adapter is a wireless network adapter and the operation of the wireless network adapter is controlled by a device driver that is run by the embedded switch.

8. A computer program product comprising non-transitory computer readable storage media having program instructions embodied therewith for controlling operation of a switch embedded within a computer, the program instructions executable by a processor of the embedded switch to:
select one of a plurality of network adapters coupled to the embedded switch for handling communications with an external network, wherein the plurality of network adapters differ by at least one of a transmission medium and a transmission speed;
direct communications between a central processing unit of the computer and the external network through the selected network adapter;
direct communications between a management processor of the computer and the external network through the selected network adapter; and
direct communications between the central processing unit and each of a plurality of external endpoint devices, wherein the communications with each external endpoint device among the plurality of external endpoint devices use any of the plurality of network adapters that are able to establish a connection with the external endpoint device, and wherein the one of the plurality of network adapters that is currently providing the fastest available connection to the external network is selected for handling communications with the external network.

9. The computer program product of claim 8, wherein the communications between the central processing unit and the plurality of external endpoint devices include sensor data received from the external endpoint devices.

10. The computer program product of claim 9, wherein the communications between the central processing unit and one of the plurality of external endpoint devices further include a control instruction sent from the central processing unit to the external endpoint device.

11. The computer program product of claim 8, wherein the plurality of network adapters includes a wireless network adapter and a wired network adapter.

12. The computer program product of claim 8, wherein the plurality of network adapters includes a wireless local area network adapter and a wireless mobile telecommunication network adapter.

13. The computer program product of claim 8, wherein the program instructions are further executable by the processor of the embedded switch to:
provide network property information to the plurality of network adapters.

14. A computer program product comprising non-transitory computer readable storage media having program instructions embodied therewith for controlling operation of a switch embedded within a computer, the program instructions executable by a processor of the embedded switch to:
select one of a plurality of network adapters coupled to the embedded switch for handling communications with an external network, wherein the plurality of network adapters differ by at least one of a transmission medium and a transmission speed;
direct communications between a central processing unit of the computer and the external network through the selected network adapter;
direct communications between a management processor of the computer and the external network through the selected network adapter;
direct communications between the central processing unit and each of a plurality of external endpoint devices, wherein the communications with each external endpoint device among the plurality of external endpoint devices use any of the plurality of network adapters that are able to establish a connection with the external endpoint device;
logically bundle each of a plurality of connections provided by the plurality of network adapters between the embedded switch and an external network, wherein only one of the bundled connections supports communication with the external network at any given point in time;

detecting failure of a connection provided by the selected network adapter; and automatically select a different one of the network adapters for handling communications with the external network in response to detecting failure of the currently selected one of the bundled connections.

15. A computer program product comprising non-transitory computer readable storage media having program instructions embodied therewith for controlling operation of a switch embedded within a computer, the program instructions executable by a processor of the embedded switch to:

select one of a plurality of network adapters coupled to the embedded switch for handling communications with an external network, wherein the plurality of network adapters differ by at least one of a transmission medium and a transmission speed;

direct communications between a central processing unit of the computer and the external network through the selected network adapter;

direct communications between a management processor of the computer and the external network through the selected network adapter;

direct communications between the central processing unit and each of a plurality of external endpoint devices, wherein the communications with each external endpoint device among the plurality of external endpoint devices use any of the plurality of network adapters that are able to establish a connection with the external endpoint device;

logically cluster the computer with a second computer having a second embedded switch and a second plurality of network adapters coupled to the second embedded switch;

designate one of the embedded switches to handle network communications for the clustered computers;

direct communications between any of the clustered computers and the external network through the designated embedded switch; and automatically designate a different one of the embedded switches of the clustered computers to handle network communications for the clustered computers in response to detecting failure of a component of the computer including the designated embedded switch, wherein the component is selected from the central processing unit, the management processor and the embedded switch.

16. The computer program product of claim 15, wherein the designated embedded switch uses a virtual network address to handle network communications for the clustered computers, and wherein each embedded switch uses a separate network address for communications with the designated embedded switch.

17. The computer program product of claim 16, wherein the virtual network address is selected from a virtual media access control address and a virtual internet protocol address.

* * * * *